(12) United States Patent
Song et al.

(10) Patent No.: US 6,393,930 B1
(45) Date of Patent: May 28, 2002

(54) BALL SCREW WITH INNER BALL CIRCULATION AND LINEAR ACTUATOR EQUIPPED WITH THE BALL SCREW

(75) Inventors: Se Kyong Song; Wan Soo Kim, both of Seoul; Dong Soo Kwon; Hyung Suck Cho, both of Taejun, all of (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/560,683

(22) Filed: Apr. 27, 2000

(30) Foreign Application Priority Data

Apr. 29, 1999 (KR) ......................................... 1999-15368

(51) Int. Cl.[7] ............................................... F16H 25/22
(52) U.S. Cl. ................................................. 74/424.8 R
(58) Field of Search ....................................... 74/424.85

(56) References Cited

U.S. PATENT DOCUMENTS

| 2,398,789 | A | * | 4/1946 | Hoffar | 74/424.85 |
| 2,975,649 | A | * | 3/1961 | Propst | 74/424.87 |
| 4,258,584 | A | * | 3/1981 | Haegele et al. | 74/424.85 |
| 4,660,431 | A |   | 4/1987 | Heine |  |
| 5,560,251 | A |   | 10/1996 | Babinski |  |

* cited by examiner

Primary Examiner—Allan D. Herrmann
(74) Attorney, Agent, or Firm—Akin, Gump, Strauss, Hauer & Feld, L.L.P.

(57) ABSTRACT

A ball screw with inner ball circulation whose transfer displacement to size ratio is large, resulting in a device which has an optimized size with a positioning accuracy measured in microns, and a linear actuator equipped with the ball screw, are disclosed. The ball screw includes a plurality of balls arranged in a space between a hemispherical groove formed on a cylindrical inner surface of a housing and a hemispherical groove of a rotating male screw. The ball screw also includes a ball circulation tube with its cylindrical outer surface formed with the hemispherical groove of the male screw and with the groove corresponding to the hemispherical groove of the housing. The ball circulation tube is formed with ball openings penetrating from both ends of the male screw toward the inner part. The ball screw also includes a ball circulation section, which fits inside the ball circulation tube, and has a hemispherical inner return path formed on its outer cylindrical surface. By coupling the ball circulation section to the ball circulation tube, the inner return path has a start point and end point which are matched with the ball openings of the ball circulation tube and the ball circulation tube and the ball circulation section can rotate together as a fixed unit with the balls circulating along the inner return path of the ball circulation section.

5 Claims, 8 Drawing Sheets

US 6,393,930 B1

BALL SCREW WITH INNER BALL CIRCULATION AND LINEAR ACTUATOR EQUIPPED WITH THE BALL SCREW

TECHNICAL FIELD

The present invention relates to a ball screw with inner ball circulation and a linear actuator equipped with the ball screw, and, specifically, to a ball screw formed such that balls can circulate in a ball circulation tube and a ball circulation section and to a linear actuator which linearly moves a housing by the ball screw.

BACKGROUND OF THE INVENTION

Recently, according to its increased demand and importance in the fields of manufacturing and processing accurate parts, fabricating semiconductors, microsurgery, genetic manipulation, and the like, a study for development and use of a robot capable of accurate and precise work has been performed. Also, development of a linear actuator having a linear driving range with several microns of position accuracy, employed in a robot for performing accurate and precise work, has been studied.

The development of a linear actuator which is equipped with a link connecting a moving platform and a base platform of a parallel manipulator and linearly moves has been developed and used all over the world since 1980s.

As a linear actuator conventionally employed, there are air pressure actuators, oil pressure actuators, piezo-electric actuators, voice coil actuators and the like. These actuators are not used widely since they are difficult to manufacture and their transfer displacement to size ratio is small.

A ball screw according to the conventional art is disclosed in U.S. Pat. No. 5,560,251 entitled "A BALL NUT AND A SCREW ASSEMBLY", and U.S. Pat. No. 4,660,431 entitled "ROTARY MOTION LINEAR ACTUATOR".

The ball screw according to the conventional art, as shown in FIG. 1, consists of a screw axis 1 formed with a male screw, a plurality of balls 2 contacting the groove of the male screw of the screw axis 1, a housing 3 formed on its cylindrical inner surface with a female thread corresponding to the male screw of the screw axis 1 and surrounding the balls 2, and a outer return path 4.

The outer return path 4 serves as a passage for circulating the balls 2 when the screw axis 1 rotates. The outer return path 4 is formed as a tube surrounding the screw axis 1. The balls 2 continuously roll and circulate between the male screw of the screw axis 1 and the female thread of the housing 3 through the outer return path 4. Such balls 2 serve to minimize the frictional force due to rotation of the screw axis 1.

However, the ball screw according to the conventional art has a problem in that it is not employed in a structure where a density of mechanisms is great, such as a parallel manipulator, since the outer return path formed exterior to the screw axis increases the size of the apparatus.

Also, the linear actuator equipped with the conventional ball screw has a problem in that the links interfere with each other since it is provided between links of the parallel manipulator.

Moreover, the linear actuator equipped with the conventional ball screw is difficult to employ in the fields of small robots, equipments for microsurgery and the like since it is equipped with a relatively large ball screw.

Further more, the linear actuator equipped with the conventional ball screw has a problem with its transfer displacement to size ratio.

SUMMARY OF THE INVENTION

Accordingly, the present invention is invented in order to solve the aforementioned problems.

It is an object of the present invention to provide a ball screw with inner ball circulation and a linear actuator equipped with the ball screw in which its transfer displacement to size ratio is improved.

It is another objective of the present invention to provide a ball screw with inner ball circulation and a linear actuator equipped with the ball screw having an optimized size and several microns of position accuracy.

In order to solve the aforementioned problems, the present invention is provided with a ball screw including a cylindrical housing having a cylindrical inner surface formed with a female thread and a plurality of balls arranged in a space between said female thread and a male screw corresponding to said female thread, the ball screw comprising: a ball circulation tube with a male screw formed on its outer cylindrical surface which corresponds to said female thread of said housing and formed with ball openings to penetrate from both ends of said male screw toward an inner part; and a ball circulation section with an inner return path formed on its cylindrical outer surface, whose start point and end point are matched with said ball openings of said ball circulation tube, wherein, when said ball circulation tube and said ball circulation section rotate in unison, said balls circulate along the inner return path of said ball circulation section.

According to the ball screw of the present invention, said ball openings of said ball circulation tube are formed to have a torsion angle of 13° with respect to a cross section perpendicular to an axis of said ball circulation tube and a torsion angle of 25° with respect to a cross section including the axis of said circulation tube.

According to the ball screw of the present invention, said ball circulation tube is fixed by a coupling nut coupled to said ball circulation section.

Also, according to the present invention, a linear actuator is provided in which a housing of a ball screw, operated by a driving motor fixed with a holder, linearly moves along with a linear guide wherein the size of said ball screw is optimized by said ball screw comprising: a ball circulation tube with a male screw formed on its outer cylindrical surface which corresponds to a female thread of said housing and formed with ball openings to penetrate from both ends of said male screw toward the inner part; and a ball circulation section with an inner return path formed on its cylindrical outer surface whose start point and end point are matched with said ball openings of said ball circulation tube.

According to the linear actuator of the present invention, a closed end surface of said housing is formed with a screw hole into which an equipment bar for said actuator is screw-coupled.

According to the linear actuator of the present invention, said holder is formed with a linear guide of which moving line is equal to that of said linear guide of said housing.

BRIEF DESCRIPTION OF THE DRAWINGS

The embodiments of the present invention will be explained with reference to the accompanying drawings, in which.

DETAILED DESCRIPTION OF THE INVENTION

Hereinafter, preferred embodiments of a ball screw with inner ball circulation and a linear actuator equipped with the ball screw according to the present invention are specifically explained, referring to the accompanied drawings.

Figure 1:
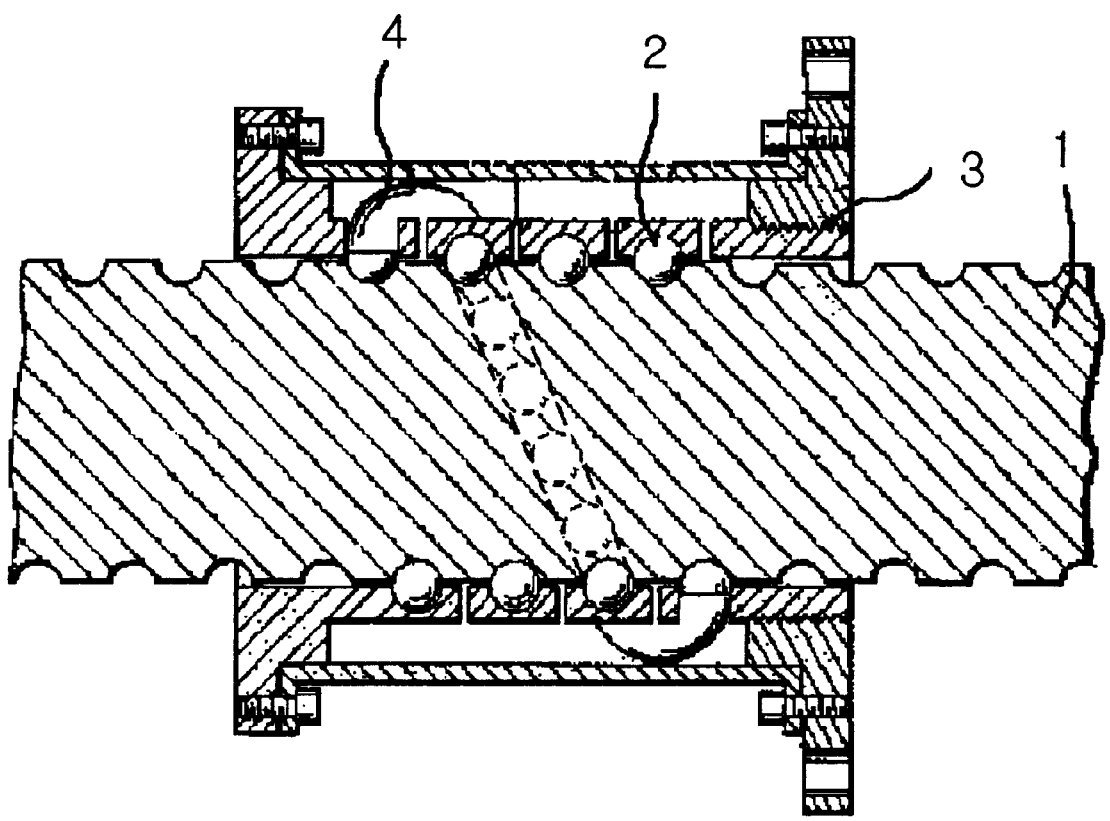
FIG. 1 is a cross-sectional view for explaining a structure of a conventional ball screw.
Figure 2:
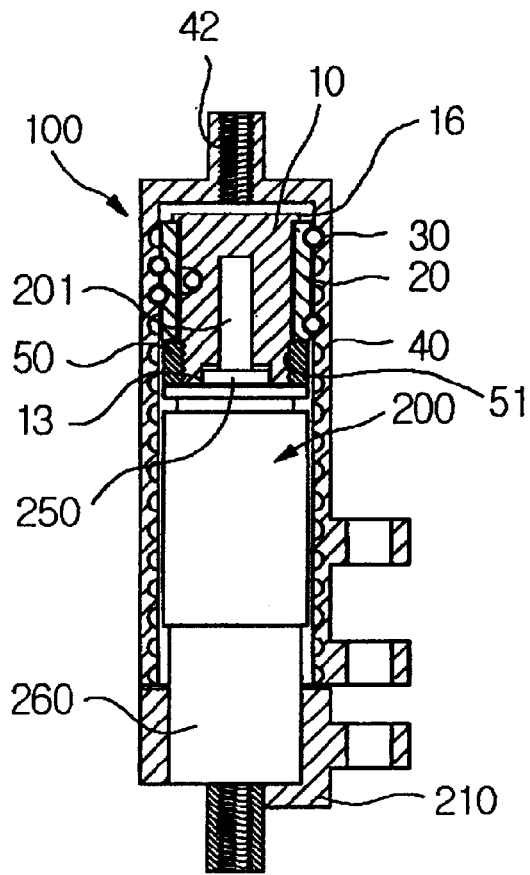
FIG. 2 is a cross-sectional view for explaining a ball screw with inner ball circulation and a linear actuator equipped with the ball screw according to an embodiment of the present invention.
Figure 3A:
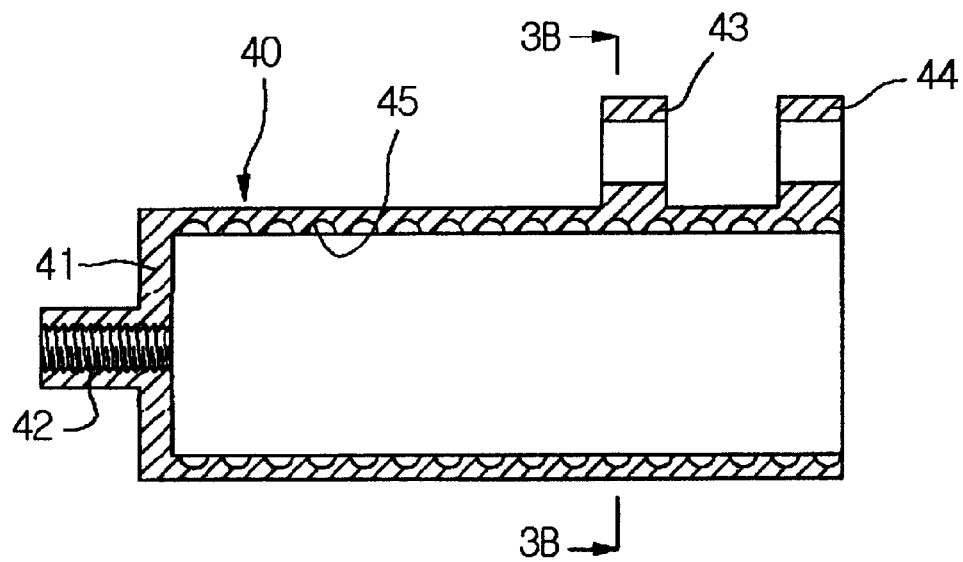
FIG. 3A and FIG. 3B are a cross-sectional view and a side view for explaining a housing of the ball screw with inner ball circulation as shown in FIG. 2, respectively.
Figure 3B:
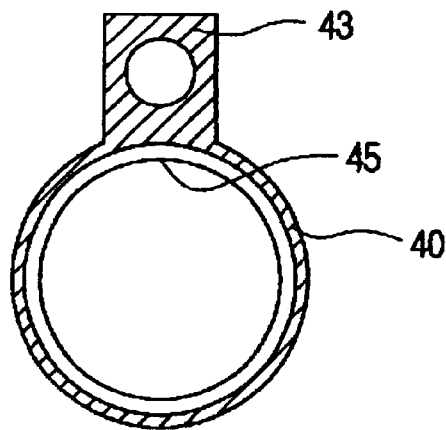
Figure 4A:
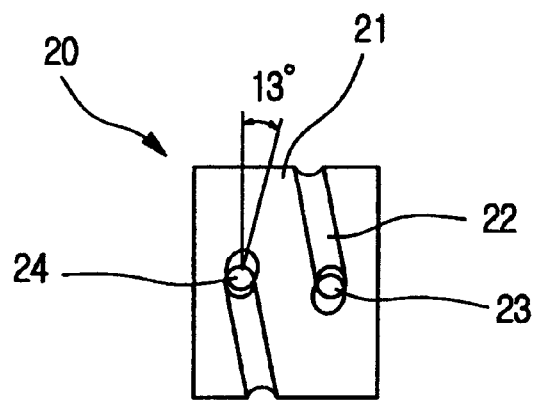
FIG. 4A through FIG. 4D are drawings for explaining a ball circulation tube of the ball screw with inner ball circulation as shown in FIG. 2.
Figure 4B:
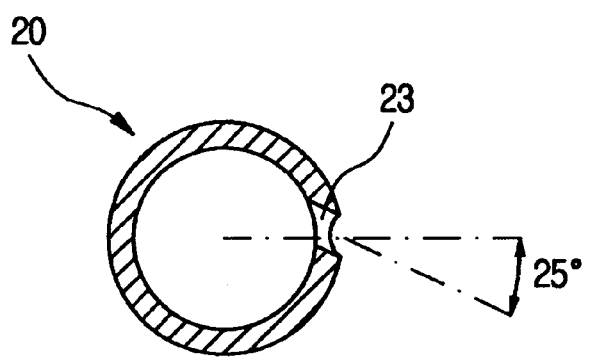
Figure 4C:
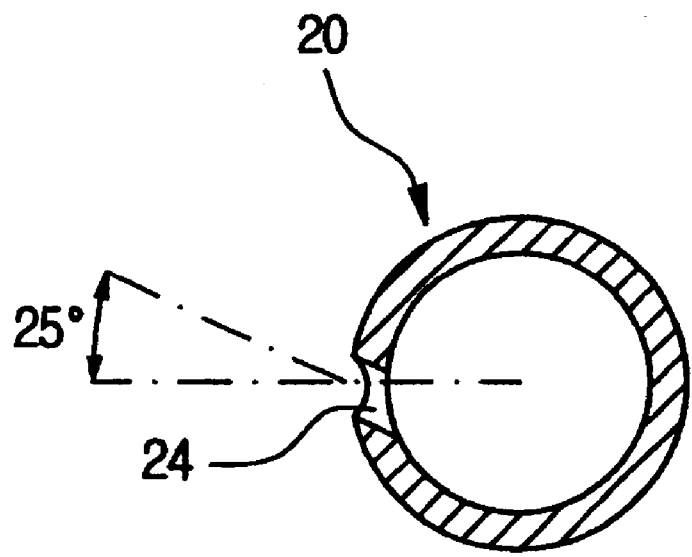
Figure 4D:
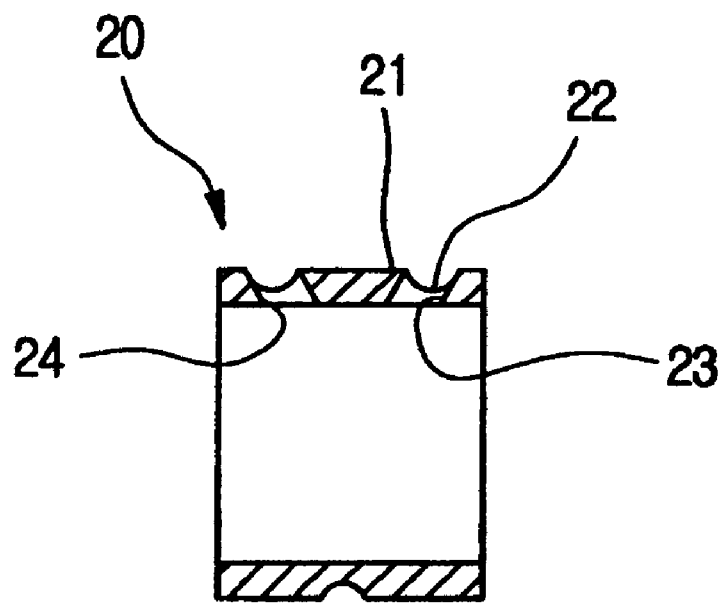
Figure 5A:
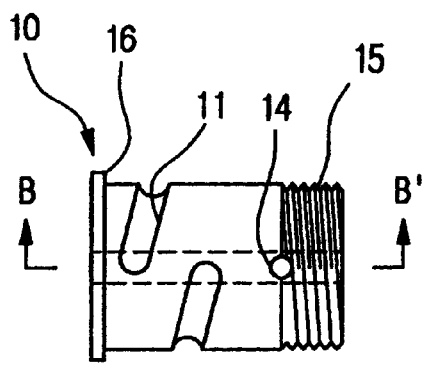
FIG. 5A through FIG. 5D are drawings for explaining a ball circulation section of the ball screw with inner ball circulation as shown in FIG. 2.
Figure 5B:
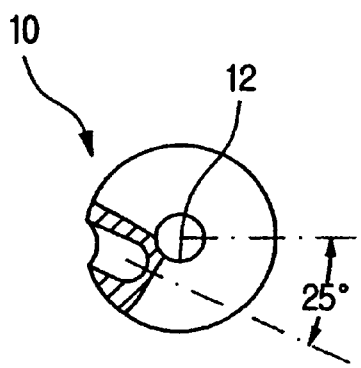
Figure 5C:
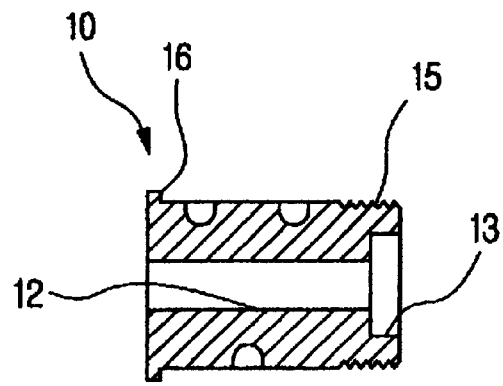
Figure 5D:
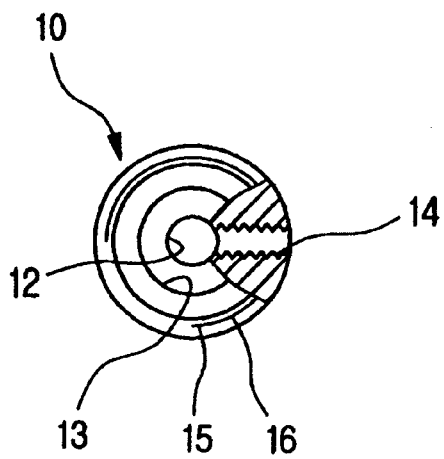
Figure 6A:
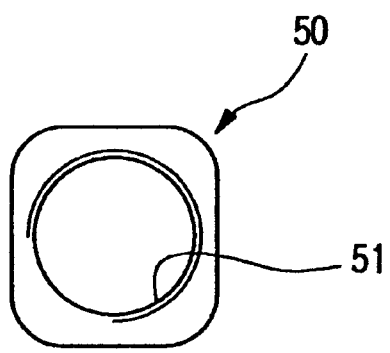
FIG. 6A and FIG. 6B are a side view and a cross-sectional view for explaining a coupling nut of the ball screw with inner ball circulation as shown in FIG. 2, respectively.
Figure 6B:
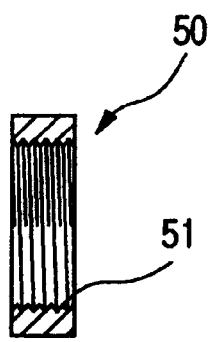
Figure 7A:
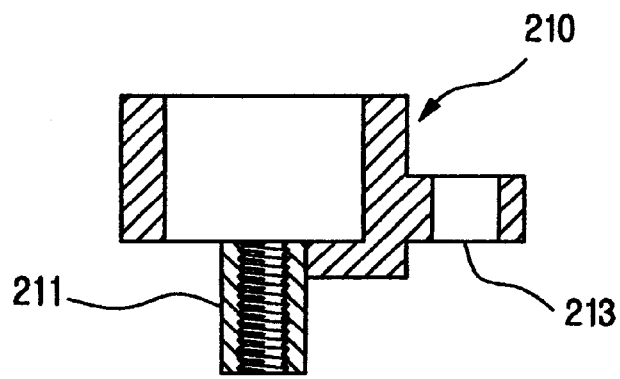
FIG. 7A through FIG. 7D are drawings for explaining a holder of a driving motor for moving the ball screw with inner ball circulation as shown in FIG. 2.
Figure 7B:
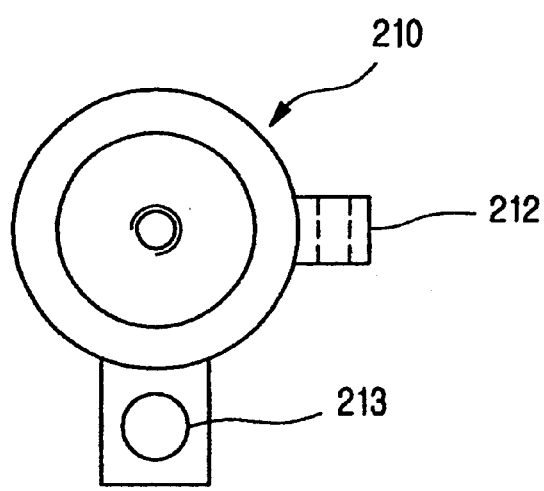
Figure 7C:
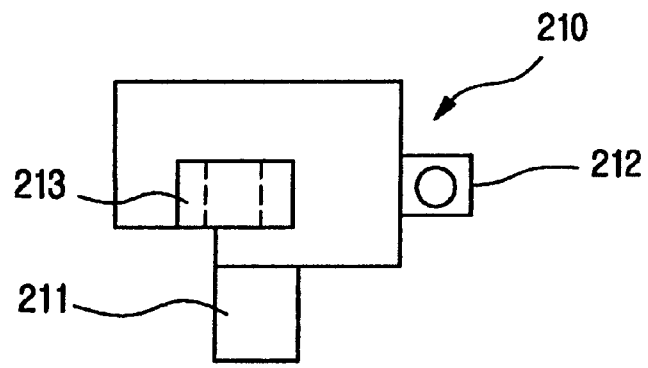
Figure 7D:
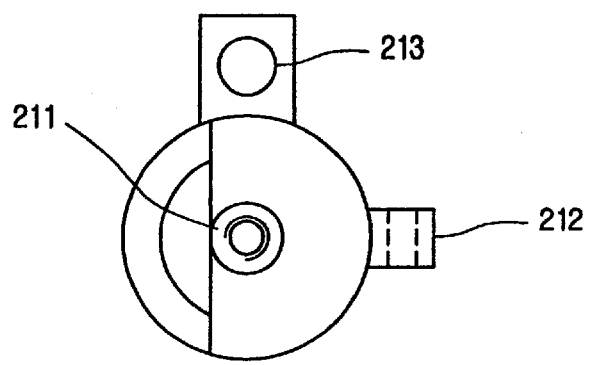
Figure 8:
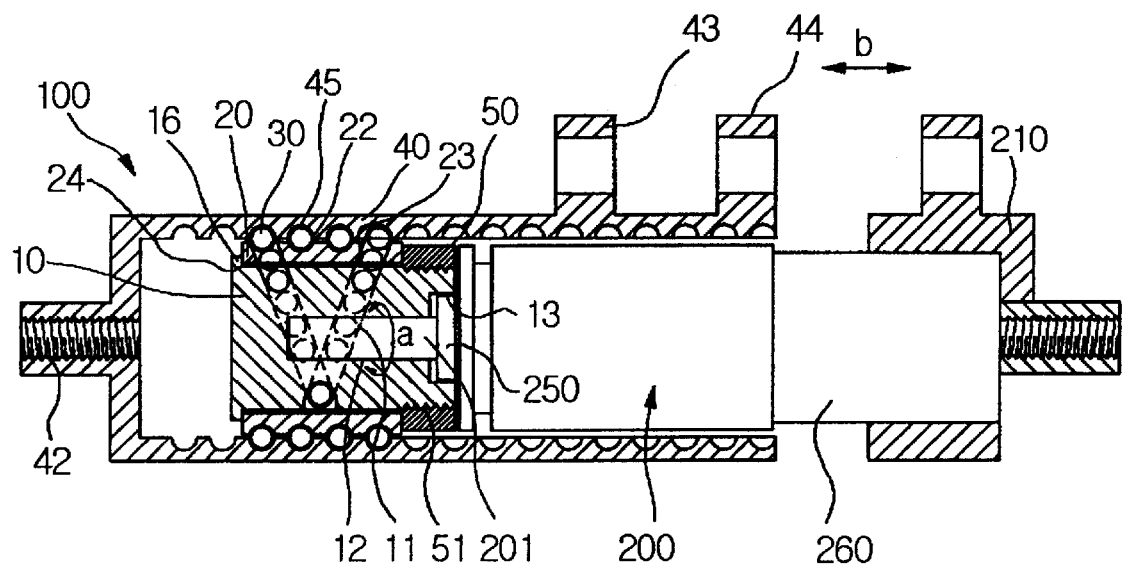
FIG. 8 is a cross-sectional view for explaining a coupling relation of the ball screw is with inner ball circulation and the linear actuator equipped with the ball screw, and an operating method thereof.

In the drawings, FIG. 2 a cross-sectional view for explaining a ball screw with inner ball circulation and a linear actuator equipped with the ball screw according to an embodiment of the present invention, FIG. 3A and FIG. 3B are a cross-sectional view and a side view for explaining a housing of the ball screw with inner ball circulation as shown in FIG. 2, respectively, and FIG. 4A through FIG. 4D are drawings for explaining a ball circulation tube of the ball screw with inner ball circulation as shown in FIG. 2. Moreover, FIG. 5A through FIG. 5D are drawings for explaining a ball circulation section of the ball screw with inner ball circulation as shown in FIG. 2, FIG. 6A and FIG. 6B are a side view and a cross-sectional view for explaining a coupling nut of the ball screw with inner ball circulation as shown in FIG. 2, respectively, and FIG. 7A through FIG. 7D are drawings for explaining a holder of a driving motor for moving the ball screw with inner ball circulation as shown in FIG. 2. Also, FIG. 8 is a cross-sectional view for explaining a coupling relation of the ball screw with inner ball circulation and the linear actuator equipped with the ball screw, and an operating method thereof.

In FIG. 2, the linear actuator according to an embodiment of the present invention has a ball screw which makes a housing 40 linearly move due to the rolling action of the balls 30 when a ball circulation section 10 and a ball circulation tube 20 rotate in unison.

Also, the linear actuator has a driving motor 200 for providing power to the ball screw 100 and a holder 210 for fixedly holding the driving motor 200. The driving motor 200 is capable of running in a forward or reverse direction and is controlled by general electronic control methodology, where the speed and rotary angle can be controlled, as in a small servomotor.

The housing 40 of the linear actuator of the present invention, as shown in FIG. 3A and FIG. 3B, is formed to have a shape of a cylinder with a closed end surface 41 and with the other end open. A center of the end surface 41 of the housing 40 is formed with a screw hole 42 into which an equipment bar for the linear actuator is screw-coupled. Linear guides 43 and 44 project from the cylindrical outer surface of the open end of the housing 40, and guide the linear movement of the housing 40 along the axis of the housing 40.

The cylindrical inner surface of the housing 40 is longitudinally formed with female thread 45. Such female thread 45 is formed to have a hemispherical groove with a depth and pitch in which half of a rolling ball 30 substantially makes contact with the groove.

As shown in FIG. 4A through FIG. 4D, the ball circulation tube 20 which is inserted into the inside diameter of the housing 40 has a thickness a little larger than a diameter of a ball 30. The cylindrical outer surface of the ball circulation tube 20 is formed with a male screw 21. The male screw 21 is formed to have a hemispherical groove 22 with a depth and pitch corresponding to the female thread 45 of the housing 40. On both ends of the groove 22 of the male screw 21, ball openings 23 and 24 permit rolling balls 30 to pass through and to penetrate the male screw 21. Here, the ball openings 23 and 24 have a diameter lager than that of the balls 30 and are formed to have a first torsion angle 13° with respect to the cross section perpendicular to an axis of said ball circulation tube 20 and a second torsion angle 25° with respect to a cross section including the axis of said circulation tube 20.

As shown in FIG. 5A through FIG. 5D, the cylindrical outer surface of the ball circulation section 10 is formed with an inner return path 11 through which the balls 30 circulate after passing through the ball openings 23 and 24 of the ball circulation tube 20. The inner return path 11 is a trench having substantially an elliptic cross section and having a depth and pitch capable of matching the outer surface of the balls 30. Both ends of the inner return path 11 are formed to be matched with the ball openings 23 and 24 of the ball circulation tube 20. A torsion angle of the inner return path 11 in the direction of depth is 25° and is equal to the second torsion angle of the ball circulation tube 20 in order to smoothly roll the balls 30.

Ball circulation section 10 has an outer diameter of a size which will permit it to be inserted into an inner diameter of the ball circulation tube 20. A through hole in the ball circulation section 10 is formed with a first opening 12 having a diameter so that a rotary shaft 201 of the driving motor 200 can be inserted therein and with a second opening 13 having a diameter larger than the first opening 12. Here, the second opening 13 is for receiving a projection 250 of the driving motor 200. Also, the cylindrical surface of one side of the ball circulation section 10 is formed with a bolt-fixing opening 14 which is perpendicular to the first opening 12 and provides access for a bolt for fixing the shaft 201 of the driving motor to the ball circulation section 10. The cylindrical outer surface of the ball circulation section 10 in the area of the bolt-fixing opening 14 is formed with a male thread 15 for receiving a coupling nut 50. The end of the ball circulation section 10, opposite the bolt-fixing opening 14, is formed with a rim 16 to prevent the ball circulation tube 20 from moving in the axial direction.

As shown in FIG. 6A and FIG. 6B, the coupling nut 50 is formed to have a diameter so that it can be inserted into the inner diameter of the housing 40. The inner diameter of the coupling nut 50 is formed with a female thread 51 allowing it to be screw-coupled with the male thread 15 of the ball circulation section 10.

As shown in FIG. 7A through FIG. 7D, the holder 210 has a diameter so that it can safely receive a lower portion 260 of the driving motor 200. An outer diameter of the holder 210 is equal to the diameter of the housing 40. The function of holder 210 is to support the driving motor 200. The equipment bar for actuator is formed on a lower portion 260 of the holder 210. A cylindrical surface of one end of the holder 210 is formed so that a fixing terminal 212 having bolt-fixing openings is projected, a cylindrical surface of the other end of the holder 210 in the direction perpendicular to the fixing terminal 212 is formed with a linear guide 213 having an equipping hole corresponding to equipping position of the linear guide of the housing 40.

Hereinafter, a coupling relation of a linear actuator and the ball screw 100 of the present invention as described above will be described.

As shown in FIG. 8, in the ball screw 100 of the present invention, the ball circulation tube 20 is inserted into the housing 40. The plurality of balls 30 slidably get in contact with the groove 22 between the female thread 45 of the housing 40 and the male thread of the ball circulation tube 20. The ball circulation section 10 is inserted into the inner diameter of the ball circulation tube 20 and the ball circulation tube 20 is supported by the projected rim 16 of the ball circulation section 10. The supported ball circulation tube 20 is fixed to the ball circulation section 10 by the coupling nut 50. The plurality of balls 30 are filled in rows in the inner return path 11 of the ball circulation section 10 and the ball openings 23 and 24 of the ball circulation tube 20. Accordingly, the plurality of balls 30 can circulate along with the inner return path 11 when the ball circulation tube 20 and the ball circulation section 10 rotate in unison. A rotary shaft 201 fits into a shaft through hole formed in the ball circulation section 10 having a first opening 12 and a second opening 13 so that the rotary shaft 201 can be coupled to the ball circulation section 10 by the use of a fixing bolt inserted into the bolt fixing opening 14. The driving motor 200 is fixed to the holder 210 not in contact with the inner diameter of the housing 40.

Hereinafter, operation of the ball screw with inner ball circulation and the linear actuator equipped with the ball screw will be described.

First, the driving motor 200 is connected to the outer power source for driving the motor and a wire of a sensor is connected for measuring an amount of rotation of the driving motor 200. The power source can make the rotary shaft 201 of the driving motor 200 rotate in a limited rotating number and rotating angle, and can control the amount of rotation of the rotary shaft 201 using the wire of the sensor. Thus, the rotary shaft 201 of the driving motor 200 rotates limitedly with the ball circulation section 10, the ball circulation tube 20 and the coupling nut 50 coupled to the rotary shaft 201 rotating at the same time. At this time, the balls 30 roll in rows through the inner return path 11 in proportion to the amount of rotation of the rotary shaft 201. That is, rolling of the balls 30 forms an inner closed loop in the rotating ball circulation section 10 and the rotating ball circulation tube 20, unlike the outer return path of the conventional ball screw.

Rolling of the balls generates a driving force in the housing 40. The driving force of the housing pushes the housing 40 by the holder 210 fixed to the driving motor 200. The pushed housing 40 linearly moves by the linear guides 43 and 44.

The ball screw with inner ball circulation and the linear actuator equipped with the ball screw is capable of displacement in a forward and reverse linear direction, since the shaft 201 of the driving motor 200 can rotate in a forward or reverse direction according to a controller.

As described above, the ball screw with inner ball circulation according to the present invention has the advantage of being smaller than a conventional ball screw because the balls circulate inside of the rotating ball circulation tube and the rotating ball circulation section.

Moreover, the ball screw with inner ball circulation according to the present invention has the advantage of having a very small size, but having a transfer displacement that is very large in comparison to a conventional ball screw.

Because of its very small size, the linear actuator equipped with the ball screw according to the present invention, can be employed in areas of usage requiring several microns of position accuracy, such as industrial fields requiring accurate linear movement, manufacturing and processing of accurate parts, fabrication of semiconductors, microsurgery, genetic manipulation, and the like.

Also, the linear actuator equipped with the ball screw according to the present invention can be fabricated in very small size and employed in devices where links interfere with each other, such as parallel manipulator.

Moreover, the linear actuator equipped with the ball screw according to the present invention can have its housing and holder modified to accept additional parts required for other works.

Although representative embodiments of the ball screw with inner ball circulation and the linear actuator equipped with the ball screw according to the present invention have been disclosed for illustrative purposes with reference to the appended drawings, the present invention should not be limited to the embodiments. Those who are skilled in the art will appreciate that various modifications, additions and substitutions are possible without departing from the scope and spirit of the present invention as defined in the accompanying claims and the equivalents thereof.

What we claim:

1. A ball screw including a cylindrical housing having a cylindrical inner surface formed with a female thread and a plurality of balls arranged in a space between said female thread and a male screw corresponding to said female thread, the ball screw comprising:

a ball circulation tube with a male screw formed on its outer cylindrical surface which corresponds to said female thread of said housing and formed with ball openings to penetrate from both ends of said male screw toward an inner part; and a ball circulation section with an inner return path formed on its cylindrical outer surface, whose start point and end point are matched with said ball openings of said ball circulation tube, said ball circulation tube being fixed by a coupling nut coupled to said ball circulation section, wherein, when said ball circulation tube and said ball circulation section rotate in unison, said balls circulate along said inner return path of said ball circulation section.

2. The ball screw according to claim 1, wherein said ball openings of said ball circulation tube are formed to have a torsion angle of 13° with respect to a cross section perpendicular to an axis of said ball circulation tube and a torsion angle of 25° with respect to a cross section including the axis of said circulation tube.

3. A linear actuator where a housing of a ball screw operated by a driving motor fixed with a holder, linearly moves along with a linear guide wherein the size of said ball screw is optimized by said ball screw comprising:

a ball circulation tube with a male screw formed on its outer cylindrical surface which corresponds to a female thread of said housing and formed with ball openings to penetrate from both ends of said male screw toward an inner part; and a ball circulation section with an inner return path formed on its cylindrical outer surface, whose start point and end point are matched with said ball openings of said ball circulation tube.

4. The linear actuator according to claim 3, wherein a closed end surface of said housing is formed with a screw hole into which an equipment bar for said actuator is screw-coupled.

5. The linear actuator according to claims 3, wherein said holder is formed with a linear guide of which moving line is equal to that of said linear guide of said housing.

* * * * *